(12) United States Patent
Deng et al.

(10) Patent No.: US 11,840,007 B2
(45) Date of Patent: Dec. 12, 2023

(54) HANDLE-ORIENTING PREFORM FEEDING MECHANISM AND ORIENTING PREFORM FEEDING METHOD FOR A BOTTLE PREFORM WITH A HANDLE

(71) Applicant: GUANGZHOU TECH-LONG PACKAGING MACHINERY CO., LTD, Guangzhou (CN)

(72) Inventors: Zhijun Deng, Guangzhou (CN); Daqun Zou, Guangzhou (CN); Kuiwei Song, Guangzhou (CN); Dong Li, Guangzhou (CN)

(73) Assignee: GUANGZHOU TECH-LONG PACKAGING MACHINERY CO., LTD, Guangdong (CN)

( * ) Notice: Subject to any disclaimer, the term of this patent is extended or adjusted under 35 U.S.C. 154(b) by 174 days.

(21) Appl. No.: 17/421,502

(22) PCT Filed: May 9, 2020

(86) PCT No.: PCT/CN2020/089393
§ 371 (c)(1),
(2) Date: Jul. 8, 2021

(87) PCT Pub. No.: WO2021/189609
PCT Pub. Date: Sep. 30, 2021

(65) Prior Publication Data
US 2022/0339844 A1 Oct. 27, 2022

(30) Foreign Application Priority Data
Mar. 23, 2020 (CN) .......................... 202010207155.8

(51) Int. Cl.
*B29C 49/42* (2006.01)
*B29C 49/00* (2006.01)
*B29L 31/00* (2006.01)

(52) U.S. Cl.
CPC ...... *B29C 49/42119* (2022.05); *B29C 49/071* (2022.05); *B29C 49/42065* (2022.05); *B29L 2031/7158* (2013.01)

(58) Field of Classification Search
CPC ......... B29C 49/42065; B29C 49/42119; B29C 49/071; B29C 49/4205; B29C 49/42155; B29C 49/42095; B29L 2031/7158
See application file for complete search history.

(56) References Cited

U.S. PATENT DOCUMENTS

| 2011/0114452 A1 | 5/2011 | Zoppas et al. |
| 2015/0202820 A1 | 7/2015 | Thibodeau et al. |
| 2019/0084210 A1 | 3/2019 | Mellen et al. |

FOREIGN PATENT DOCUMENTS

| CN | 102529072 | 7/2012 |
| CN | 102806656 | 12/2012 |

(Continued)

OTHER PUBLICATIONS

International Search Report of PCT/CN2020/089393 dated Dec. 25, 2020.

(Continued)

*Primary Examiner* — Monica A Huson
(74) *Attorney, Agent, or Firm* — Woodard, Emhardt, Henry, Reeves & Wagner, LLP

(57) ABSTRACT

Provided are a handle-orienting preform feeding mechanism and orienting preform feeding method for a bottle preform with a handle. Under the combined action of the axial rotation of a plastic bottle preform and a handle positioning structure on a preform feeding tray, the handle of the plastic bottle preform with an integrated handle (especially a PET plastic bottle preform with an integrated handle) is positioned so that the plastic bottle preform with an integrated handle enters a heating machine and a bottle blowing machine of the next process according to the predetermined (Continued)

orientation. Accordingly, the wrong orientation of the integrated handle of the plastic bottle preform is avoided so that a mechanical arm can grasp the plastic bottle preform correctly and place the plastic bottle preform at the correct position of a bottle blowing mold. Thus the plastic bottle preform can be blown successfully.

14 Claims, 3 Drawing Sheets

(56) References Cited

FOREIGN PATENT DOCUMENTS

| CN | 103128958 | 6/2013 |
|---|---|---|
| CN | 207345065 | 5/2018 |

OTHER PUBLICATIONS

Extended European Search Report in related EP20908464.9 dated Oct. 6, 2022.

HANDLE-ORIENTING PREFORM FEEDING MECHANISM AND ORIENTING PREFORM FEEDING METHOD FOR A BOTTLE PREFORM WITH A HANDLE

This is a national stage application filed under 37 U.S.C. 371 based on International Patent Application No. PCT/CN2020/089393, filed May 9, 2020, which claims priority to Chinese Patent Application No. 202010207155.8 filed Mar. 23, 2020, the disclosures of which are incorporated herein by reference in their entireties.

TECHNICAL FIELD

The present disclosure relates to a handle-orienting preform feeding mechanism for a bottle preform with a handle and an orienting preform feeding method for a bottle preform with a handle.

BACKGROUND

Currently, plastic bottles with handles (particularly plastic milk bottles) in the market are roughly categorized into two types, HDPE plastic bottles with integrated handles and PET plastic bottles with rear-mounted handles. However, both of the two types are defective. As for the HDPE plastic bottles, there exist the following problems. Firstly, due to the material formability, the HDPE plastic bottles can only be extrusion blow molded (in the following process: PE resin raw material→collosol making→parison extruding→mold closing→blowing, pressure holding→cooling→mold opening→molded product extracting (subsequent trimming), etc.) The molds of the HDPE plastic bottles are complex, expensive, and of low output, with the cost of a single set more than doubling that of PET molds. Secondly, the HDPE plastic bottles, not strong enough and easily broken, need additional turnaround boxes during transportation and storage, which increases the transportation cost of manufactures and requires more storage space. Thirdly, tremendous wastes are produced during the manufacturing of the HDPE plastic bottles, still the subsequent trimming is evitable for such bottles. Fourthly, the manufacturing of the HDPE plastic bottles requires plenty of resin materials, which reaches 30% of PET materials of the same specification. Fifthly, HDPE has poor oxygen barrier performance, making the contained milk easily oxidized and deteriorated. As for the PET plastic bottles, injection stretch blow molding is implemented (in the following process: PET resin raw material→drying-→collosol making→high-pressure injection molding→pressure holding→cooling→mold opening→preform removing-→tube billet temperature adjusting→mold closing→stretch blow molding→pressure holding→cooling→mold opening-→molded product extracting). Such PET plastic bottles solve the preceding problems of the HDPE plastic bottles and have the advantages including reliable sealing, strong bottle, high oxygen barrier performance, and transparency for easy observation. However, the handles of the PET plastic bottles still need to be manufactured and installed on the plastic bottles by using specific devices currently, which requires additional production cost. In view of the above, those skilled in the art consider replacing the HDPE plastic bottles with integrated handles with the PET plastic bottles with integrated handles. However, the existing preform feeding mechanism applied to the PET plastic bottle preforms is not applicable to the PET plastic bottle preforms with integrated handles. The reason lies in that with the implementation of such a mechanism, a plastic bottle preform cannot be grasped correctly and placed at the correct position of a bottle blowing mold in a bottle blowing machine by a mechanical arm. In this case, the blowing of the plastic bottle preform fails.

SUMMARY

The present disclosure aims to provide a handle-orienting preform feeding mechanism and an orienting preform feeding method that are applicable to a PET plastic bottle with an integrated handle.

The handle-orienting preform feeding mechanism for a bottle preform with a handle according to the present disclosure includes a base plate. A preform feeding component is disposed on the base plate. A preform feeding channel is disposed on a side of the preform feeding component and on the base plate. A preform blocking mechanism is disposed on a side of the preform feeding channel and on the base plate. A preform feeding tray is joined to and around the preform feeding component and is configured to rotate along with the preform feeding component. A plurality of preform engaging grooves are disposed on the outer edge of the preform feeding tray at intervals. A preform blocking tray is disposed on the periphery of the preform feeding tray and on the base plate. A transmission gap for conveying a bottle preform is formed between the inner edge of the preform blocking tray and the outer edge of the preform feeding tray. The head end of the transmission gap is butted to the tail end of the preform feeding channel. A handle positioning structure is disposed on a side of each preform engaging groove and on the preform feeding tray.

The orienting preform feeding method for a bottle preform with a handle according to the present disclosure includes the steps below.

(1) The plastic bottle preform with a handle is caused to enter the preform feeding channel continuously.

(2) The preform blocking mechanism is caused to retract during the bottle blowing process. The plastic bottle preform is conveyed into the transmission gap through the preform feeding channel. Then the neck of the plastic bottle preform is engaged into one of the preform engaging grooves on the preform feeding tray.

(3) The plastic bottle preform is caused to rotate on the axis of the plastic bottle preform when friction is applied to the neck of the plastic bottle preform in the transmission gap. The plastic bottle preform is stopped from rotating on the axis of the plastic bottle preform when the handle of the plastic bottle preform is brought into contact with the handle positioning structure on the preform feeding tray.

(4) The preform feeding tray is caused to continue rotating and drive the plastic bottle preform to rotate until the plastic bottle preform is output from the preform feeding mechanism and enters the next process.

Provided are a handle-orienting preform feeding mechanism for a bottle preform with a handle and an orienting preform feeding method for a bottle preform with a handle. Under the combined action of the axial rotation of a plastic bottle preform and a handle positioning structure on a preform feeding tray, the handle of the plastic bottle preform with an integrated handle (especially a PET plastic bottle preform with an integrated handle) is positioned so that the plastic bottle preform with an integrated handle enters a heating machine and a bottle blowing machine of the next process according to the predetermined orientation. Accordingly, the wrong orientation of the integrated handle of the plastic bottle preform is avoided so that a mechanical arm can grasp the plastic bottle preform correctly and place the plastic bottle preform at the correct position of a bottle blowing mold. Thus the plastic bottle preform can be blown successfully.

DETAILED DESCRIPTION

Figure 1:
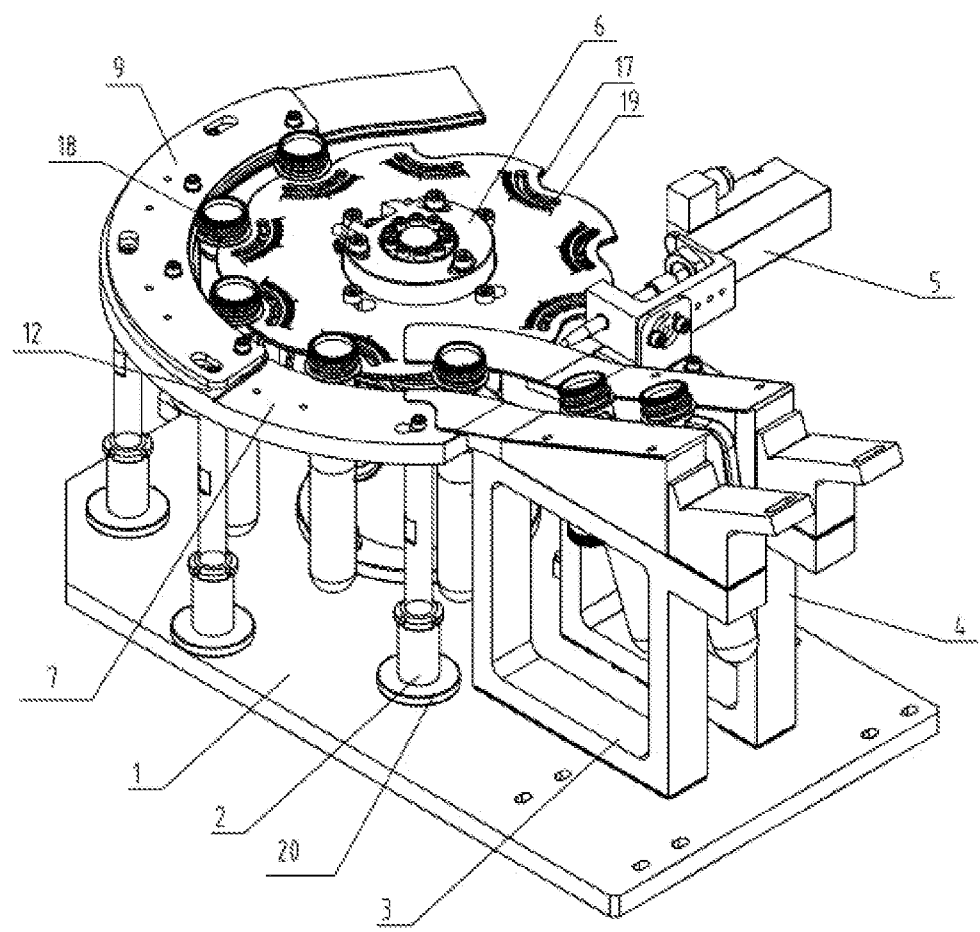
FIG. 1 is a view illustrating the structure of the present disclosure.
Figure 2:
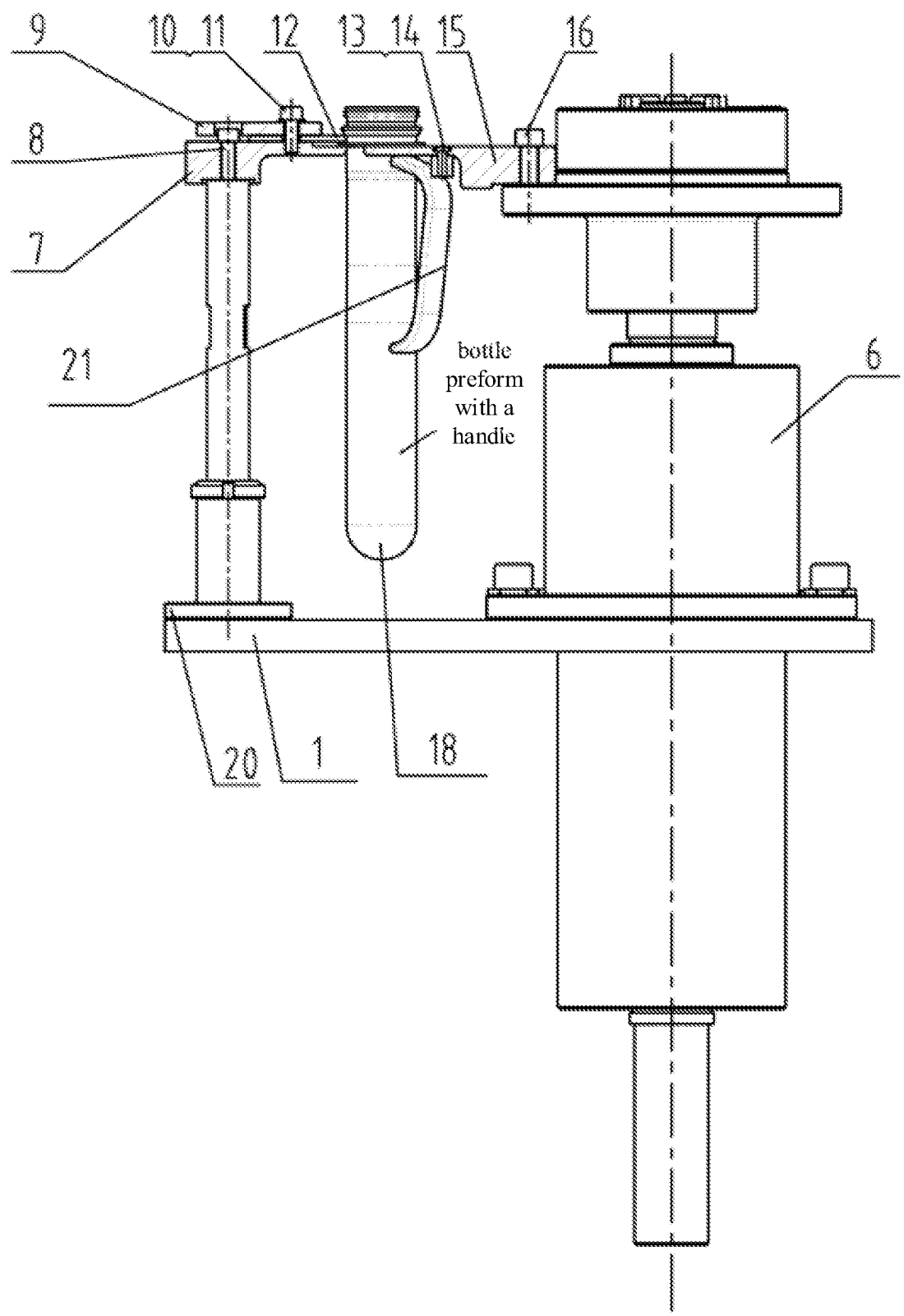
FIG. 2 is a view illustrating the structure of a plastic bottle preform engaged into a preform engaging groove.
Figure 3:
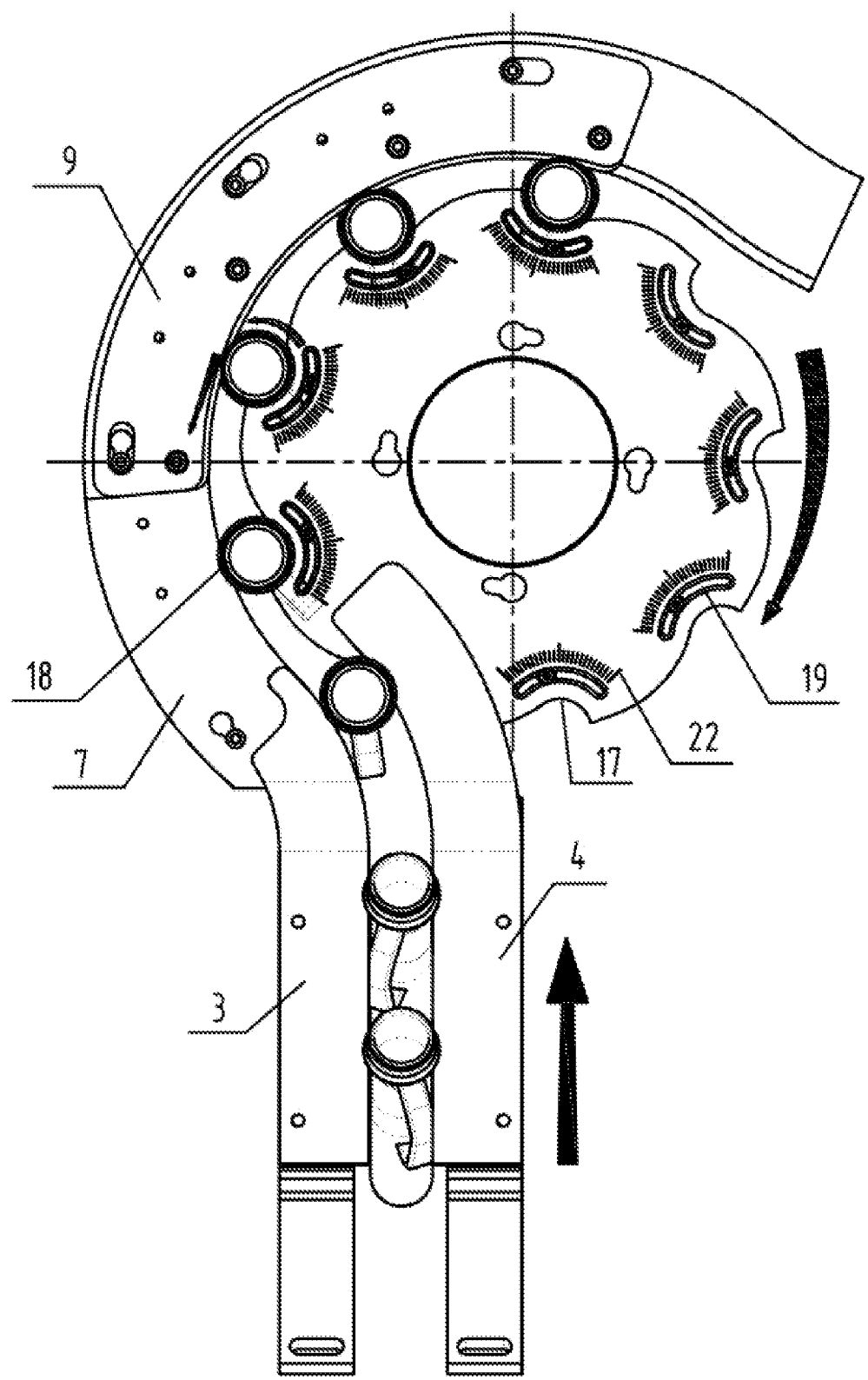
FIG. 3 is a top view of FIG. 1.

As shown in FIGS. 1 to 3, a handle-orienting preform feeding mechanism for a bottle preform with a handle includes a base plate 1. A preform feeding component 6 is disposed on the base plate 1. A preform feeding channel is disposed on a side of the preform feeding component 6 and on the base plate 1. A preform blocking mechanism 5 is disposed on a side of the preform feeding channel and on the base plate 1. A preform feeding tray 15 is joined to and around the preform feeding component 6 and rotates along with the preform feeding component 6. A plurality of preform engaging grooves 17 are disposed on the outer edge of the preform feeding tray 15 at intervals. A preform blocking tray 7 is disposed on the periphery of the preform feeding tray 15 and on the base plate 1. A transmission gap for conveying the bottle preform 18 is formed between an inner edge of the preform blocking tray 7 and the outer edge of the preform feeding tray 15. The head end of the transmission gap is butted to the tail end of the preform feeding channel. A handle positioning structure is disposed on a side of each preform engaging groove 17 and on the preform feeding tray 15. The preform feeding component 6 is a mechanism commonly used in the existing preform feeding mechanisms as the existing art. The preform blocking tray 7 is attached to the preform feeding component 6 through fasteners including a screw 8.

The handle positioning structure includes an arc-shaped through hole 19 disposed on the preform feeding tray 15. A stop pin 14 is disposed in the arc-shaped through hole 19 and is slidable relative to the arc-shaped through hole 19. The stop pin 14, when sliding to any position of the arc-shaped through hole 19, may be fastened thereto to fix the position of the stop pin 14 and thus orient the integrated handle 21 of the plastic bottle preform 18. A screw 13 is used for ensuring that the stop pin 14 is fixed in the arc-shaped through hole 19. The screw 13 penetrates through the arc-shaped through hole 19 from top to bottom and is screwed into the interior of the stop pin 14, with the head end stuck onto the upper surface of the arc-shaped through hole 19. The stop pin 14 can be locked or unlocked by rotating the screw 13.

A scale 22 is disposed on a side of the arc-shaped through hole 19 and on the preform feeding tray 15 to determine the sliding distance of the stop pin 14.

An axial-rotation guard plate 12 is disposed on the preform blocking tray 7. When the plastic bottle preform 18 is conveyed to the axial-rotation guard plate 12, the inner edge of the axial-rotation guard plate 12 is engaged into the groove in the neck of the plastic bottle preform 18 and is in contact with the wall of the groove. The contact between the axial-rotation guard plate 12 and the wall of the groove in the neck of the plastic bottle preform 18 further guarantees sufficient friction to drive the plastic bottle preform 18 to rotate.

An axial-rotation platen 9 is disposed on the axial-rotation guard plate 12. The axial-rotation platen 9 is connected to the preform blocking tray 15 through fasteners to press the axial-rotation guard plate 12 onto the preform blocking tray 15. The fasteners may be screws (a screw 8 and a screw 10 as shown, with a gasket 11 disposed between the screw 10 and the axial-rotation platen 9) or the like. The axial-rotation guard plate 12, made of relatively soft plastic materials, will be easily deformed if fixed onto the preform blocking tray 15 by screws directly. Accordingly, the axial-rotation platen 9 made of stainless steel is used for pressing the axial-rotation guard plate 12 onto the preform blocking tray 15 to avoid the deformation of the axial-rotation guard plate 12.

The preform blocking tray 15 is disposed on the base plate 1 through a support base 2. There may exist a plurality of support bases 2 that are disposed at intervals. The support base 2 may be adjusted in height, for example, in a telescopic rod structure or a two-section sleeve threaded connection structure. A support pad 20 is disposed at the bottom of the support base to increase the support strength.

The handle-orienting preform feeding mechanism for a bottle preform with a handle further includes a left preform feeding base 3 and a right preform feeding base 4 that are connected to and spaced apart on the base plate 1. A gap between the left preform feeding base 3 and the right preform feeding base 4 forms a preform feeding channel.

The preform blocking mechanism 5 is an air cylinder.

An orienting preform feeding method for a bottle preform with a handle includes the following steps: (1) causing the plastic bottle preform 18 with the handle 21 to enter the preform feeding channel continuously; (2) causing the preform blocking mechanism 5 to retract (when the bottle blowing stops, the preform blocking mechanism 5 stretches out to prevent the plastic bottle preform 18 from entering) during the bottle blowing process, conveying the plastic bottle preform 18 into the transmission gap through the preform feeding channel, and then engaging the neck of the plastic bottle preform 18 into one of the preform engaging grooves 17 on the preform feeding tray 15; (3) causing the plastic bottle preform 18 to rotate on the axis of the plastic bottle preform 18 when friction is applied to the neck of the plastic bottle preform 18 in the transmission gap, and stopping the plastic bottle preform 18 from rotating on the axis of the plastic bottle preform 18 when the handle 21 of the plastic bottle preform 18 is brought into contact with the handle positioning structure on the preform feeding tray 15; and (4) causing the preform feeding tray 15 to continue rotating and drive the plastic bottle preform 18 to rotate until the plastic bottle preform 18 is output from the preform feeding mechanism and enters the next process.

In step (1), before the plastic bottle preform 18 is conveyed, the position of the stop pin 14 relative to the arc-shaped through hole 19 is adjusted so that the orientation of the integrated handle 21 of the plastic bottle preform 18 is predetermined.

In step (3), when the plastic bottle preform 18 rotates to the axial-rotation guard plate 12 along with the preform engaging groove 17, the inner edge of the axial-rotation guard plate 12 is engaged into the groove in the neck of the plastic bottle preform 18 and is in contact with the wall of the groove so that the friction is generated between the plastic bottle preform 18 and the axial-rotation guard plate 12 to cause the plastic bottle preform 18 to rotate on the axis of the plastic bottle preform 18 until the integrated handle 21 of the plastic bottle preform 18 is brought into contact with the stop pin 14.

What is claimed is:

1. A handle-orienting preform feeding mechanism for a bottle preform with a handle, comprising a base plate, wherein a preform feeding component is disposed on the base plate, a preform feeding channel is disposed on a side of the preform feeding component and on the base plate, and a preform blocking mechanism is disposed on a side of the preform feeding channel and on the base plate, a preform feeding tray is joined to and around the preform feeding component and is configured to rotate along with the preform feeding component, a plurality of preform engaging grooves are disposed on an outer edge of the preform feeding tray at intervals, a preform blocking tray is disposed on a periphery of the preform feeding tray and on the base plate, a transmission gap for conveying a bottle preform is formed between an inner edge of the preform blocking tray and the outer edge of the preform feeding tray, a head end of the transmission gap is butted to a tail end of the preform feeding channel, a handle positioning structure is disposed on a side of each of the plurality of preform engaging grooves and on the preform feeding tray, and the handle positioning structure comprises an arc-shaped through hole disposed on the preform feeding tray, and a stop pin is disposed in the arc-shaped through hole and is slidable relative to the arc-shaped through hole.

2. The handle-orienting preform feeding mechanism for a bottle preform with a handle according to claim 1, wherein a scale is disposed on a side of the arc-shaped through hole and on the preform feeding tray.

3. The handle-orienting preform feeding mechanism for a bottle preform with a handle according to claim 1, wherein an axial-rotation guard plate is disposed on the preform blocking tray, and when the plastic bottle preform is conveyed to the axial-rotation guard plate, an inner edge of the axial-rotation guard plate is configured to be engaged into a groove in a neck of the plastic bottle preform and be in contact with a wall of the groove.

4. The handle-orienting preform feeding mechanism for a bottle preform with a handle according to claim 3, wherein an axial-rotation platen is disposed on the axial-rotation guard plate, and the axial-rotation platen is connected to the preform blocking tray through a fastener to press the axial-rotation guard plate onto the preform blocking tray.

5. The handle-orienting preform feeding mechanism for a bottle preform with a handle according to claim 1, wherein the preform blocking tray is disposed on the base plate through a support base.

6. The handle-orienting preform feeding mechanism for a bottle preform with a handle according to claim 1, further comprising a left preform feeding base and a right preform feeding base that are connected to and spaced apart on the base plate, wherein a gap between the left preform feeding base and the right preform feeding base forms the preform feeding channel.

7. The handle-orienting preform feeding mechanism for a bottle preform with a handle according to claim 2, wherein an axial-rotation guard plate is disposed on the preform blocking tray, and when the plastic bottle preform is conveyed to the axial-rotation guard plate, an inner edge of the axial-rotation guard plate is configured to be engaged into a groove in a neck of the plastic bottle preform and be in contact with a wall of the groove.

8. The handle-orienting preform feeding mechanism for a bottle preform with a handle according to claim 2, wherein the preform blocking tray is disposed on the base plate through a support base.

9. The handle-orienting preform feeding mechanism for a bottle preform with a handle according to claim 4, wherein the preform blocking tray is disposed on the base plate through a support base.

10. The handle-orienting preform feeding mechanism for a bottle preform with a handle according to claim 2, further comprising a left preform feeding base and a right preform feeding base that are connected to and spaced apart on the base plate, wherein a gap between the left preform feeding base and the right preform feeding base forms the preform feeding channel.

11. The handle-orienting preform feeding mechanism for a bottle preform with a handle according to claim 4, further comprising a left preform feeding base and a right preform feeding base that are connected to and spaced apart on the base plate, wherein a gap between the left preform feeding base and the right preform feeding base forms the preform feeding channel.

12. An orienting preform feeding method for a bottle preform with a handle, comprising:

(1) causing a plastic bottle preform with a handle to enter a preform feeding channel continuously;

(2) causing a preform blocking mechanism to retract during a bottle blowing process, conveying the plastic bottle preform into a transmission gap through the preform feeding channel, and then engaging a neck of the plastic bottle preform into one of a plurality of preform engaging grooves on a preform feeding tray;

(3) causing the plastic bottle preform to rotate on an axis of the plastic bottle preform when friction is applied to the neck of the plastic bottle preform in the transmission gap, and stopping the plastic bottle preform from rotating on the axis of the plastic bottle preform when the handle of the plastic bottle preform is brought into contact with a handle positioning structure on the preform feeding tray; and (4) causing the preform feeding tray to continue rotating and drive the plastic bottle preform to rotate until the plastic bottle preform is output from a preform feeding mechanism and enters a next process;

wherein in step (1), before the plastic bottle preform is conveyed, a position of a stop pin relative to an arc-shaped through hole is adjusted so that an orientation of the handle of the plastic bottle preform is predetermined.

13. The orienting preform feeding method for a bottle preform with a handle according to claim 12, wherein in step (3), when the plastic bottle preform rotates to an axial-rotation guard plate along with the preform engaging groove, an inner edge of the axial-rotation guard plate is engaged into a groove in the neck of the plastic bottle preform and is in contact with a wall of the groove so that a friction is generated between the plastic bottle preform and the axial-rotation guard plate to cause the plastic bottle preform to rotate on the axis of the plastic bottle preform until the handle of the plastic bottle preform is brought into contact with the stop pin.

14. A handle-orienting preform feeding mechanism for a bottle preform with a handle, comprising a base plate, wherein a preform feeding component is disposed on the base plate, a preform feeding channel is disposed on a side of the preform feeding component and on the base plate, and a preform blocking mechanism is disposed on a side of the preform feeding channel and on the base plate, a preform feeding tray is joined to and around the preform feeding component and is configured to rotate along with the preform feeding component, a plurality of preform engaging grooves are disposed on an outer edge of the preform feeding tray at intervals, a preform blocking tray is disposed on a periphery of the preform feeding tray and on the base plate, a transmission gap for conveying a bottle preform is formed between an inner edge of the preform blocking tray and the outer edge of the preform feeding tray, a head end of the transmission gap is butted to a tail end of the preform feeding channel, a handle positioning structure is disposed on a side of each of the plurality of preform engaging grooves and on the preform feeding tray, and the preform blocking tray is disposed on the base plate through a support base.

* * * * *